May 21, 1929.    A. J. SCHMITT    1,714,141
SELF ALIGNING GASKET AND SEAT THEREFOR
Filed Oct. 19, 1927
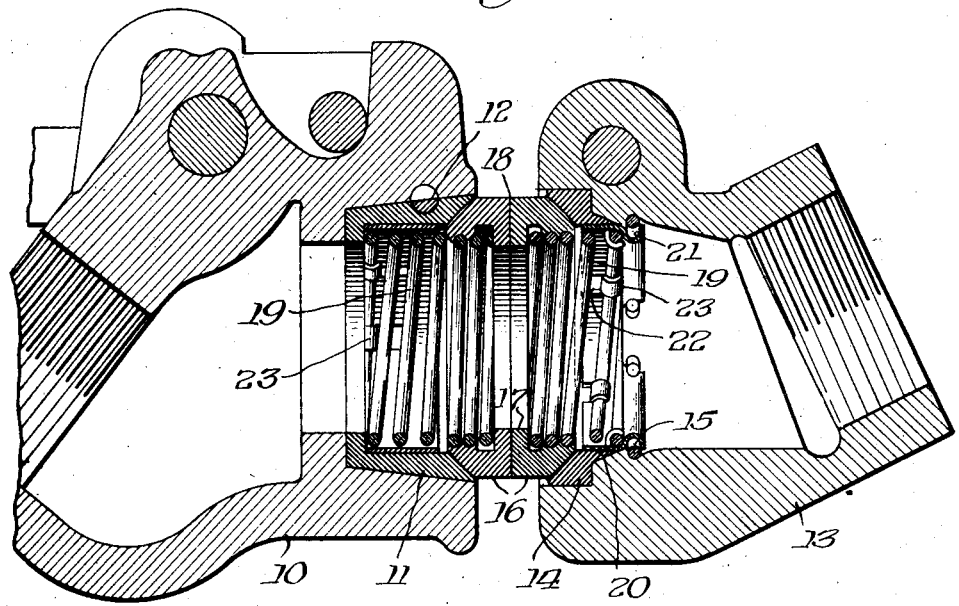
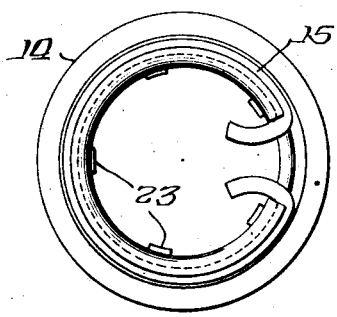
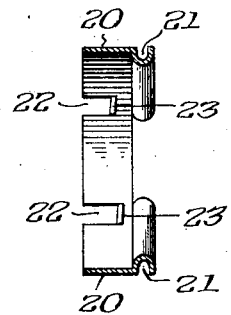
Witness:
Inventor:
Arthur J. Schmitt,
By Casper L. Redfield
Atty Patented May 21, 1929.

1,714,141

UNITED STATES PATENT OFFICE.

ARTHUR J. SCHMITT, OF CHICAGO, ILLINOIS.

SELF-ALIGNING GASKET AND SEAT THEREFOR.

Application filed October 19, 1927. Serial No. 227,118.

My invention relates to gaskets, and more particularly to those gaskets used in train pipe couplings. The object of my invention is to provide a gasket of highly durable material, and one which will accommodate itself automatically to the rocking movements used in coupling and uncoupling train pipes. Also, one which can be used in standard couplers without modification.

Heretofore, gaskets to be used for this purpose have been made of some rubber composition which has a comparatively short life, or of metal such as iron or brass which would oxidize to a greater or less extent and is undesirably rigid. Those which could move on their seats to accommodate the rocking movements of coupling and uncoupling required special coupling heads or were pivoted so that their movements were limited to pivotal movements. Such limitation requires the provision of means for locating the pivots of the gasket accurately with respect to the coupler within which it is to be held.

In the present invention I make my gasket and the seat therefor out of some highly durable and non-corroding material, such as some member of the phenol-resin group, and provide means by which the gasket is held firmly to its seat, yet is capable of universal oscillation thereon. The first of these gives long life to the gasket, and the second avoids the necessity of providing means for accurately locating the gasket and its seat with respect to the head within which they are held.

In the accompanying drawings—

Fig. 1 is a sectional elevation of standard coupler heads of two types supporting seats of corresponding types with gaskets on similarly formed seating faces;

Fig. 2 is a rear elevation of the seat at the right in Fig. 1; and

Fig. 3 is a section detached of the sleeve secured in the seat.

In Fig. 1, the head 10 is one within which the seat 11 is held in place by a rotatable keeper 12, and the head 13 is one within which the seat 14 is held in place by an expansion ring 15. As the difference between seats 11 and 14 is simply a difference of exterior to fit the head within which it is placed, a description of seat 14 and its gasket 16 will be sufficient.

The exterior of the gasket 16 is in the form of a zonal section of a sphere, and the bearing face of the seat is concave to match the convexity of the gasket. Or, stated in another way, the gasket and seat form a ball and socket limited to a comparatively narrow zone.

The smallest opening 17 of the gasket is at the face 18 where it meets the face of a similar gasket in the seat 11. A short distance back of the face 18, the interior of the gasket is screw threaded to a slightly greater diameter than the opening 17, and into this is screwed the end of a helical spring 19. Or the gasket may be molded upon the end of the spring so that the two are permanently secured together. In either case, the interior diameter of the helix is intended to be equal to the diameter of the opening 17.

Inside of the seat 14 is the ordinary sleeve 20 having its projecting end provided with a circumferential groove 21 to receive the expansion ring 15. At a plurality of places 22, the inner part of the sleeve 20 is punched and the punched part is bent inward to form inwardly projecting tongues 23. That end of the spring 19 which is not secured to the gasket, is screwed upon the tongues 23, and the tongues are then bent over to grasp one coil of the spring as shown in Fig. 1. In seat 11, the tongues 23 are formed on the end of the sleeve and are bent inward to grasp the last coil of the spring, but this is an immaterial detail.

The spring is under longitudinal tension to hold the gasket to its seat, and the coils of the spring are slightly separated from each other so that the gasket is free to oscillate in any direction on its seat. The tension, however, holds the parts together so that it requires a moderate force to oscillate the gasket.

It is to be observed that the gasket and its seat are adapted to fit into the standard coupling heads, and provide an unobstructed port of the full size furnished by the heads themselves. Also, that the gasket is held to its seat by a spring concealed within the structure itself, and that the spring permits free oscillation of the gasket on its seat in any direction. This last makes it unnecessary to provide special means for locating the gasket rotatively with respect to the coupler head. As a consequence, any convenient fastening means for the seat may be used.

What I claim is:—

1. In a device of the class described, the combination with a coupler head providing a receiving recess, a tubular member detachably held in said recess and providing a concave seat at its outer end, a gasket in the form of a ring having a convex surface fitting the concave seat, and a helical spring having one end connected to the tubular member and the other end connected to the gasket.

2. A gasket in the form of a ring having one face flat and the other face convex, a part of the interior of the ring being enlarged and providing means for the connection of a spring, a second ring having a concave face to fit the convex face of the first ring, means on the second ring for the connection of a spring, a helical spring connecting the means on one ring with the means on the other ring, and means for securing the second ring in a coupler head.

3. In a device of the class described, a gasket seat consisting of a tubular member, a metallic sleeve within said tubular member and providing projections, a helical spring located in part within said sleeve and having one of its coils connected to said projections, and a gasket mounted on said seat and connected to the projecting part of said spring.

4. The combination with a coupler head providing a receiving recess and means by which a gasket seat may be secured therein, of an annular gasket member and an annular seat member jointly providing a tubular channel the inner part of which is counterbored to a larger diameter, and a helical spring located in said counterbore and having its ends secured respectively to the seat member and the gasket member.

ARTHUR J. SCHMITT.